Dec. 19, 1922.
J. M. JONES.
SIGNAL.
FILED DEC. 15, 1921.
1,439,554.
2 SHEETS—SHEET 1.
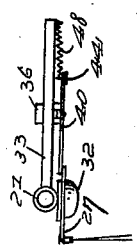
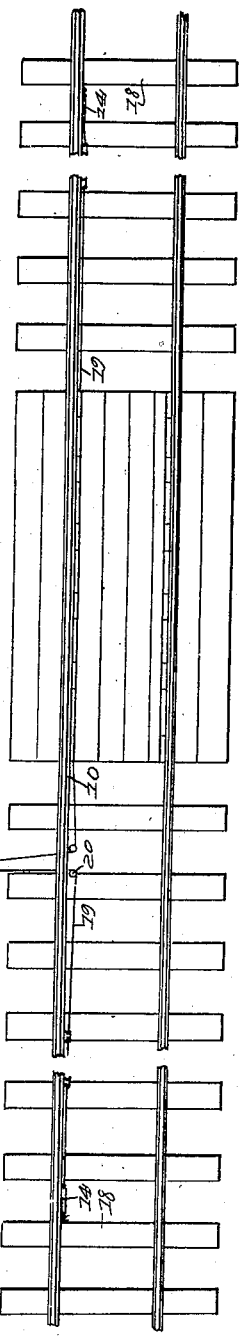
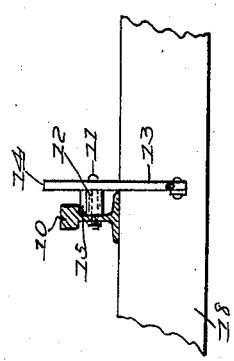
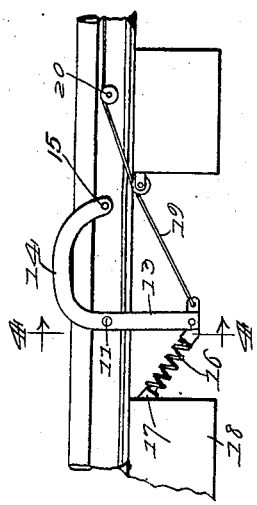
Inventor
James M. Jones.
By Frank S. Ahleman.
Attorney Dec. 19, 1922.
J. M. JONES.
SIGNAL.
FILED DEC. 15, 1921.
1,439,554.
2 SHEETS—SHEET 2.
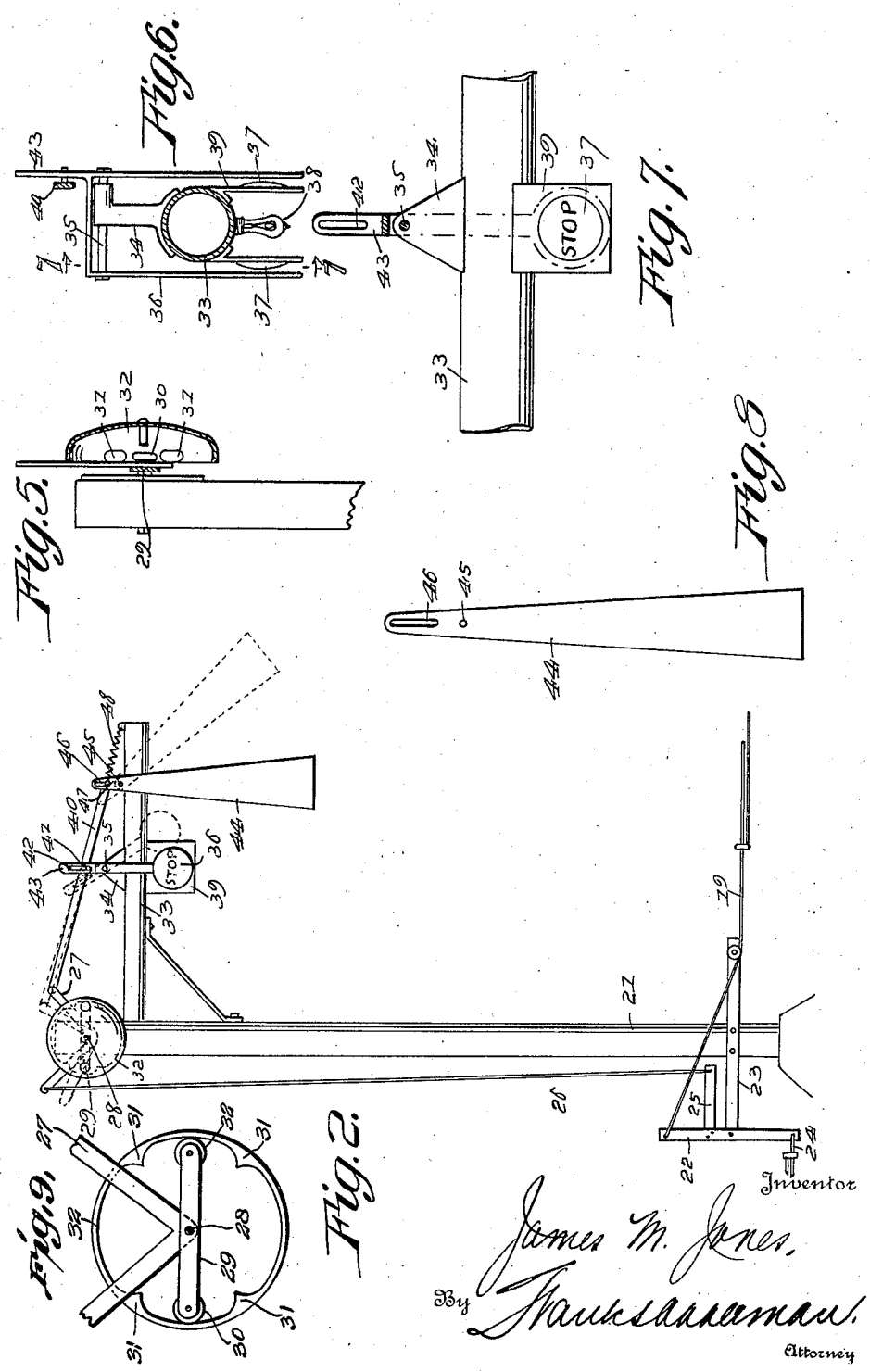

Patented Dec. 19, 1922.

1,439,554

UNITED STATES PATENT OFFICE.

JAMES MONROE JONES, OF SULPHUR SPRINGS, TEXAS.

SIGNAL.

Application filed December 15, 1921. Serial No. 522,564.

*To all whom it may concern:*

Be it known that I, JAMES M. JONES, a citizen of the United States of America, and resident of Sulphur Springs, in the county of Hopkins and State of Texas, have invented certain new and useful Improvements in Signals, of which the following is a specification.

This invention relates to signals, and particularly to a car or engine operated signal actuating means effective to display the visual signal and sound an audible signal simultaneously and intermittently, in order that the attention of travelers will be directed to the said signal; it being the opinion of the inventor that an intermittent sound is more effective in attracting attention than one that is continuous; and it being furthermore the opinion of the inventor that a movable visual signal is more effective in attracting attention than one that is stationary.

An object of this invention is to produce novel means moved by the wheels of a car or engine, to be hereinafter referred to as a "car," which is traveling on the track with relation to which the signal actuating mechanism is installed, novel means being provided for flashing a lamp and moving a semaphore arm simultaneously; and furthermore, the provision of means for ringing a bell while the device is in operation.

It is a further object of this invention to produce novel means adapted to be struck by the wheels of the car in its travel over the track, so that the device is operated by each car wheel to produce pulsations or movements of the signaling means to accomplish the result stated.

It is a further object of this invention to provide novel means for actuating the parts simultaneously through the employment of connections from the wheel tripped element.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a plan view of a signaling apparatus embodying the invention;

Figure 2 illustrates a view in elevation of the signal post and the signals mounted thereon, associated with the connections from the car tripped element;

Figure 3 illustrates an enlarged detailed view of the car tripped element;

Figure 4 illustrates a sectional view on the line 4—4 of Fig. 3;

Figure 5 illustrates a sectional view of the audible signal;

Figure 6 illustrates a view in elevation of the edge of the visual signal;

Figure 7 illustrates a sectional view on the line 7—7 of Fig. 6; and

Figure 8 illustrates an enlarged detailed view of the semaphore arm or paddle.

Fig. 9 illustrates an enlarged view of the audible signal.

In these drawings 10 denotes one of the rails having a stud 11 secured to a web thereof. A sleeve 12 is applied to the stud and has its end bearing against the web, the said sleeve serving as an abutment for the tripping lever 13 that is oscillatably mounted on the stud. The tripping lever has its upper end curved as shown at 14 in the direction that the car is to move and it terminates below the lower surface of the head of the rail where it is provided with a pin 15 extending under the head of the rail to limit the oscillatory motion of the said tripping lever.

The end of the lever below the pivot has a compression spring 16 engaging it, and the said spring is anchored to an abutment 17, here shown as being applied to a cross tie 18. A flexible element 19 such as a cable is attached to the opposite side of the lever and it operates over guide pulleys such as 20 along the track and is guided in a suitable manner as by the idle pulleys 20 to or near the semaphore post 21. A lever 22 is oscillatable on an arm 23 carried by the semaphore post, and the said lever has the flexible member 19 connected to it above the arm 23, whereas another flexible connection or cable 24 which extends in the opposite direction along the track is connected to the said lever 22 below the arm 23. The flexible connection 24 is supplied with a tripping lever and parts associated with it similar to that heretofore described, operative at a point remote from the semaphore arm opposite to the one first described and it is intended to oscillate in a direction opposite to the first mentioned one, so that a car traveling in either direction will operate the signal.

The lever has an arm 25 with which a pull rod or element 26 is connected, the said element 26 being connected to an angular lever 27 resembling a bell crank lever. The lever 27 is oscillatable on a pivot 28 and it carries a cross arm 29 having clappers 30 at its ends, the said clappers being intended to strike lugs or enlargements 31 on a bell 32, so that as the arm oscillates, the bell is rung.

A mast arm 33 projects from the post and it has a bracket 34 to receive a rod 35. A shutter or mask 36 is mounted on the rod 35 in order that the said shutter will oscillate with respect to lenses 37 between which a lamp 38 is stationed. The lenses are preferably provided with legends such as "Stop" or "Danger" and when illuminated will serve to warn travelers at night, it being the purpose of the inventor that the shutters shall oscillate with respect to the lenses and momentarily darken them as they swing past the said lenses and then permit the light to flash so that an intermittent light is displayed. The lenses are shown as being mounted on hangers 39 suspended from the mast arm, and the said shutters are integral so that they move simultaneously under the influence of a thrust arm 40 which has one end pivotally connected to the lever 27. The thrust arm, in this embodiment of the invention, has a pin 41 operating in a slot 42 of the arm 43 which rises from the shutters, and hence as the thrust arm reciprocates, the shutters are oscillated.

The visual signal or semaphore arm 44 is oscillatably mounted on a pin 45 carried by the mast arm, and the upper end of the semaphore arm has a slot 46 in which a pin 47 on the thrust arm operates to oscillate the said semaphore arm. A spring 48 is anchored to the mast arm and connected to the pin 47 and it is operative to pull the thrust arm against the action of the actuating means heretofore described.

As, therefore, the wheels of a car strike the tripping lever and operate the signals, the spring 48 operates against the action of these tripping devices and serves to produce means by which the shutters and semaphore arm are moved back and forth so that the device operates automatically in the manner stated.

I claim:

1. In a signal, a trip lever oscillatably mounted in operative relation to a track rail to be engaged by car wheels for oscillating the said lever, yieldable means for holding the trip lever in normal position, a flexible element connected to the lever and operated thereby, a post having a mast arm, an angularly disposed lever pivoted between its ends, a bell clapper carried thereby, a bell with relation to which the clapper operates, means for communicating the motion of the trip lever to the angularly disposed lever, a thrust rod pivotally connected to an end of the angularly disposed lever, a shutter oscillatably mounted with relation to the mast arm and having a slotted arm projecting therefrom, an illuminating signal back of the shutter, a pin carried by the thrust rod operating in the slot of the arm, a semaphore arm pivotally mounted on the mast arm and having a slot in one end, and a pin carried by the thrust rod operating in the said slot for oscillating the semaphore arm.

2. In a signal, a trip lever oscillatably mounted in operative relation to a track rail to be engaged by car wheels for oscillating the said lever, yieldable means for holding the trip lever in normal position, a flexible element connected to the lever and operated thereby, a post having a mast arm, an angularly disposed lever pivoted between its ends, a bell clapper carried thereby, a bell with relation to which the clapper operates, means for communicating the motion of the trip lever to the angularly disposed lever, a thrust rod pivotally connected to an end of the angularly disposed lever, a shutter oscillatably mounted with relation to the mast arm and having a slotted arm projecting therefrom, an illuminating signal back of the shutter, a pin carried by the thrust rod operating in the slot of the arm, a semaphore arm pivotally mounted on the mast arm and having a slot in one end, a pin carried by the thrust rod operating in the said slot for oscillating the semaphore arm, and means for operating the parts when the trip lever is released by the car wheels.

3. In a signal, a trip lever oscillatably mounted in operative relation to a track rail to be engaged by car wheels for oscillating the said lever, yieldable means for holding the trip lever in normal position, a flexible element connected to the lever and operated thereby, a post having a mast arm, an angularly disposed lever pivoted between its ends, a bell clapper carried thereby, a bell with relation to which the clapper operates, means for communicating the motion of the trip lever to the angularly disposed lever, a thrust rod pivotally connected to an end of the angularly disposed lever, a bracket rising from the mast arm, an oscillatable shutter mounted on the said bracket, an illuminated signal carried by the mast arm with relation to which the shutter is oscillatable, a slotted extension integral with the shutter, a pin carried by the thrust rod operating in the slot of the arm, a semaphore arm pivotally mounted on the mast arm and having a slot in one end, and a pin carried by the thrust rod operating in the said slot for oscillating the semaphore arm.

JAMES MONROE JONES.